US012759707B2

(12) United States Patent
Pieper et al.

(10) Patent No.: US 12,759,707 B2
(45) Date of Patent: Oct. 13, 2026

(54) DEVICE FOR FASTENING CABIN COMPONENTS TO AN AIRCRAFT STRUCTURE

(71) Applicant: LUFTHANSA TECHNIK AG, Hamburg (DE)

(72) Inventors: Bernd Pieper, Halstenbek (DE); Dennis Eichholz, Halstenbek (DE); Kristof Stoppe, Hamburg (DE); Volker Bonde, Buchholz (DE)

(73) Assignee: LUFTHANSA TECHNIK AG, Hamburg (DE)

( * ) Notice: Subject to any disclaimer, the term of this patent is extended or adjusted under 35 U.S.C. 154(b) by 0 days.

(21) Appl. No.: 18/841,400

(22) PCT Filed: Feb. 24, 2023

(86) PCT No.: PCT/EP2023/054756
§ 371 (c)(1),
(2) Date: Aug. 26, 2024

(87) PCT Pub. No.: WO2023/161454
PCT Pub. Date: Aug. 31, 2023

(65) Prior Publication Data

US 2025/0162714 A1 May 22, 2025

(30) Foreign Application Priority Data

Feb. 28, 2022 (DE) ..................... 10 2022 104 704.0

(51) Int. Cl.
*B64D 11/00* (2006.01)
*B64C 1/18* (2006.01)

(52) U.S. Cl.
CPC .............. *B64D 11/003* (2013.01); *B64C 1/18* (2013.01); *B64D 2011/0046* (2013.01)

(58) Field of Classification Search
CPC ............ B64D 11/0698; B64D 11/0696; B64D 2011/0046; B64C 1/061; B64C 1/066; B64C 1/12
See application file for complete search history.

(56) References Cited

U.S. PATENT DOCUMENTS 5,201,831 A * 4/1993 Higgins .................. B64C 1/066 244/119
8,661,685 B2 3/2014 Blees et al.
(Continued)

FOREIGN PATENT DOCUMENTS

DE 102007032233 A 1/2009
DE 102010026683 A1 1/2012
(Continued)

*Primary Examiner* — Justin Michael Heston
(74) *Attorney, Agent, or Firm* — LEYDIG, VOIT & MAYER, LTD.

(57) ABSTRACT

An apparatus fastens cabin components in a region of side walls, which belong to an aircraft structure and extend in a vertical direction in relation to a horizontal cabin floor. The apparatus includes a substructure, which includes: at least two supports, which are vertically arrangable on a side wall, of the sidewalls of the aircraft structure, are spaced apart in a horizontal direction, are designed in each case for fastening at at least two vertically spaced-apart defined points of attachment of the aircraft structure in the region of the side wall, and at least one panel, which connects the supports in the horizontal direction and is designed for connecting to the supports, each connected by the panel, at two vertically spaced-apart points of connection. Both the at least two supports and the at least one panel are designed in order for cabin components to be fastened thereon.

17 Claims, 3 Drawing Sheets

(56) References Cited

U.S. PATENT DOCUMENTS

| | | | |
|---|---|---|---|
| 2009/0026318 A1 | 1/2009 | Gross et al. | |
| 2011/0024565 A1* | 2/2011 | Koefinger ............... | B64C 1/068 244/131 |
| 2013/0200213 A1 | 8/2013 | Umlauft et al. | |
| 2013/0313367 A1 | 11/2013 | Voss et al. | |
| 2015/0252824 A1 | 9/2015 | Benthien et al. | |
| 2020/0002025 A1 | 1/2020 | Papendick et al. | |

FOREIGN PATENT DOCUMENTS

| | | | |
|---|---|---|---|
| DE | 102014204087 A1 | 9/2015 |
| DE | 102018210507 A1 | 1/2020 |
| DE | 102019008403 A | 6/2021 |
| EP | 3153407 A1 | 4/2017 |

* cited by examiner

DEVICE FOR FASTENING CABIN COMPONENTS TO AN AIRCRAFT STRUCTURE

CROSS REFERENCE TO RELATED APPLICATIONS

This application is a U.S. National Phase application under 35 U.S.C. § 371 of International Application No. PCT/EP2023/054756, filed on Feb. 24, 2023, and claims benefit to German Patent Application No. DE 10 2022 104 704.0, filed on Feb. 28, 2022. The International Application was published in German on Aug. 31, 2023 as WO 2023/161454 A1 under PCT Article 21 (2).

FIELD

The present disclosure relates to an apparatus for fastening cabin components in the region of side walls, which belong to an aircraft structure.

BACKGROUND

In aircraft, for example passenger aircraft, the cabin—that is to say the passenger cabin, the hold and/or the cockpit—is formed essentially by the aircraft structure or the fuselage, which together with the cabin floor confines the cabin to the form defined by the structure. It is possible here for the cabin floor to be an integral constituent part of the aircraft structure or, in the form of a separate subassembly, to be fixed thereto.

All the fittings of the cabin are fixed to the aircraft structure, so that the cabin fittings remain in a fixed position in the cabin when subjected both to loading which occurs during a flight and to loading which is stipulated for example in Title 14 CFR § 29.561 et seq. for the event of an emergency landing. For this purpose, the aircraft structure has defined points of attachment at which the cabin fittings are to be fastened.

In a passenger cabin, in addition to the passenger seats, the cabin fittings for example also include the overhead stowage bins above the seats, the wall paneling, including window blinds which may possibly be integrated therein, as well as any cable harnesses and ventilation ducts which are necessary for the cabin fittings. For the purpose of fastening in particular the passenger seats, seat rails are generally provided on the cabin floor, and these seat rails are fastened to the cabin floor and/or the aircraft structure at predetermined points of attachment and allow variable fastening of passenger seats. For the overhead stowage bins, the wall paneling and cable harnesses and ventilation ducts, defined points of attachment are provided on the aircraft structure, often on the frame members of the fuselage. These points of attachment are usually repeated, at least in regions of a uniform fuselage cross section, at regular intervals in the longitudinal direction of the fuselage, which makes it possible to use standardized subassemblies in particular comprising overhead bins and/or wall paneling.

While the points of attachment provided directly by the manufacturer on the aircraft structure or the cabin floor are sufficient in principle for fitting out the aircraft cabin in accordance with the originally intended purpose of an aircraft, the points of attachment are usually not optimal for cabin fittings for a different purpose. If for example a passenger aircraft designed for the commercial transportation of passengers is to be reconfigured into a so-called VIP aircraft with customized cabin fittings (e.g. a government aircraft) or into a hospital aircraft, then the points of attachment for the cabin fittings provided for configuring the aircraft cabin in the form of a typical passenger cabin are often ill-suited on account of their respective position being geared to fitting out a passenger cabin.

It is known in the prior art, in the case of corresponding repurposing of an aircraft and of the cabin being redesigned as a result, for the aircraft structure to be provided with additional points of attachment, which allow the desired cabin fittings to be fastened thereon. The disadvantage with this prior art is that the provision of additional or alternative points of attachment is not always possible, at least at the respectively desired position, and, furthermore, extensive approval or authorization by the competent supervisory authorities is often required.

SUMMARY

In an embodiment, the present disclosure provides an apparatus that fastens cabin components in a region of side walls, which belong to an aircraft structure and extend in a vertical direction in relation to a horizontal cabin floor. The apparatus includes a substructure, which includes: at least two supports, which are vertically arrangable on a side wall, of the sidewalls of the aircraft structure, are spaced apart in a horizontal direction, are designed in each case for fastening at at least two vertically spaced-apart defined points of attachment of the aircraft structure in the region of the side wall, and at least one panel, which connects the supports in the horizontal direction and is designed for connecting to the supports, each connected by the panel, at two vertically spaced-apart points of connection. Both the at least two supports and the at least one panel are designed in order for cabin components to be fastened thereon.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
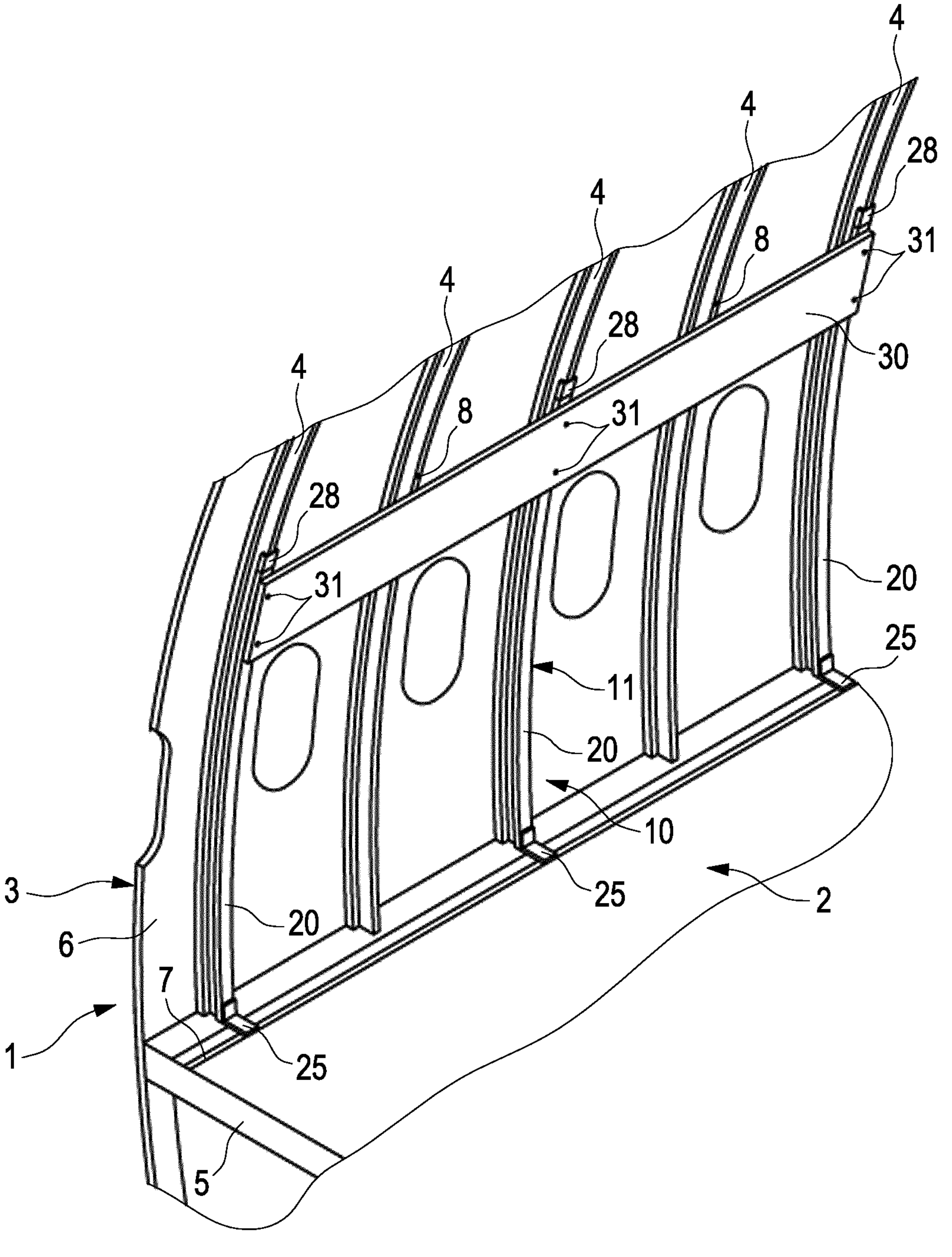
FIG. 1 shows a schematic illustration of part of an aircraft cabin fitted with an apparatus according to the present disclosure.

Aspects of the present disclosure make it possible to fasten cabin components in the region of side walls, which belong to an aircraft structure, in particular the aircraft structure of a passenger aircraft, and extend in the vertical direction in relation to a horizontal cabin floor, the prior-art disadvantages arising only to a reduced extent, if at all.

Accordingly, an aspect of the present disclosure relates to an apparatus for fastening cabin components in the region of side walls which belong to an aircraft structure and extend in the vertical direction in relation to a horizontal cabin floor, the apparatus comprising a substructure made up of:

at least two supports which can be arranged vertically on a side wall of an aircraft structure and, spaced apart in the horizontal direction, are designed in each case for fastening at at least two vertically spaced-apart defined points of attachment of the aircraft structure in the region of the side wall, and at least one panel which connects the supports in the horizontal direction and is designed for connecting to the supports, each connected by the panel, at two vertically spaced-apart points of connection, wherein both the at least two supports and the at least one panel are designed in order for cabin components to be fastened thereon.

An aspect of the present disclosure also relates to an aircraft structure comprising a horizontal cabin floor and side walls which extend in the vertical direction in relation thereto, wherein points of attachment are provided in the region of the side wall, and an apparatus according to the present disclosure is attached at these points of attachment.

In the context of the present disclosure, the terms "horizontal" and "vertical" refer to an aircraft cabin and an apparatus according to the present disclosure arranged correctly therein on the aircraft structure, wherein the cabin floor is assumed to be horizontal and, consequently, the side walls of the cabin extend in the vertical direction therefrom.

Aspects of the present disclosure involves creating a substructure that is geared to the conditions in an aircraft cabin and, on the one hand, can be fastened at existing points of attachment of the aircraft structure and, on the other hand, allows flexible fastening of cabin components in the region of the side wall of an aircraft. The substructure of the apparatus according to the present disclosure is reduced in such a way that the resulting disadvantages are more than compensated for by the advantages.

The disadvantage of the additional weight caused by the substructure, the weight being particularly relevant under the usual provisos of aircraft construction since the substructure has no function-such as for example stiffening the aircraft structure or the like-beyond creating a connection between components and the aircraft structure, is countered by the advantage of flexible fastening of cabin components in the substructure without new, authorization-dependent points of attachment on the aircraft structure possibly having to be created for this purpose. The aforementioned advantages are achieved both in the case of aircraft having a "classic" light-metal structure and, in particular, in the case of aircraft in which at least parts of the aircraft structure are produced from fiber composites. This is because, in particular in the case of structural components produced from fiber composites, new points of attachment are usually very complicated to create. Furthermore, the fundamental disadvantage of the additional weight caused by the apparatus according to the present disclosure can be mitigated by the apparatus being of lightweight construction and/or by the apparatus being provided specifically only in those regions of the aircraft structure where cabin components are actually to be fastened.

Despite the small number of necessary points of attachment, the apparatus according to the present disclosure is distinguished by a sufficiently good level of rigidity in the state in which it is fastened on the aircraft structure. This level of rigidity is achieved, in particular, by the respectively two vertically spaced-apart points of connection between the respective supports and a panel which connects the supports in the horizontal direction.

It has proven to be advantageous, and therefore preferred, if, in the state fastened vertically on an aircraft structure, the supports are designed for connecting to the panel in a region remote from the cabin floor. In the region in question, which is often above the windows in the side wall, it is usually the case that electric lines and also lines for ventilation are installed, and these lines can then be fixed on the panel at smaller intervals than would be possible if they were attached solely to the supports of the apparatus.

It is preferred if each support comprises a fastening element for fastening on a seat rail, which runs on the cabin floor, and/or a fastening element for fastening on a lower bracket for overhead stowage bins. The fastening elements can preferably be standardized fastening clips, as are used for fastening the components for which the points of attachment are originally intended. The points of attachment on the aircraft structure, which are formed by the seat rail and the bracket for overhead stowage bins, are usually points of attachment which repeat regularly, and at equal intervals, in the horizontal direction of the aircraft cabin, so that, irrespective of their ultimate installation position within an aircraft cabin, the supports and panels of the apparatus can be designed in standardized form.

It is possible in principle to use defined points of attachment of the aircraft structure to provide transverse-strut arrangements for a panel which connects the supports. A corresponding transverse-strut arrangement can additionally support, and therefore stiffen, the panel. The transverse-strut arrangements are to be selected here such that they do not stiffen the aircraft structure to the extent which renders extensive approval or authorization necessary.

It is preferred if the fastening elements are designed in an at least partially vibration-decoupling manner. A corresponding configuration can reduce the transmission of vibrations in particular from the aircraft structure to the apparatus according to the present disclosure. The fastening elements can comprise in particular grommets for this purpose.

It is usually the case that the seat rail on the cabin floor, it being possible for a support of an apparatus according to the present disclosure to be fastened on the seat rail, is arranged at a distance from the side wall of the aircraft structure.

It is preferred if each support has a shape adapted to the shaping of the side wall of an aircraft structure. The supports therefore particularly preferably have a curvature adapted to the side wall. As an alternative, or in addition, each support can have a C-shaped cross section which is open in the direction of the side wall and is preferably designed for partially accommodating frame members which run on the side wall. These measures can ensure that the apparatus according to the present disclosure fits closely against the side wall and the useful volume of the aircraft cabin is therefore not compromised in practice.

Preferably, each support is provided with a pattern of holes in order for cabin components and/or a panel to be fastened thereon, wherein the pattern of holes preferably corresponds to a rectangular grid and/or extends over all the flanges and/or webs of the profile of the support. By virtue of the supports having a corresponding pattern of holes, they can be used flexibly for different scenarios without having to be adapted in each case for specific cabin components. In the case of a rectangular pattern of holes, the spacing between holes is preferably 1 inch or 2.54 cm.

It is preferred if the at least one panel is designed in the form of a sandwich panel. This makes it possible to achieve a low weight along with a simultaneously high level of rigidity for the panel. Moreover, a correspondingly configured panel is suitable in order for cabin components to be fastened in a variable manner thereon. The panel, in particular if not configured in the form of a sandwich panel, can likewise be provided with a pattern of holes comparable with the preferred pattern of holes in the supports.

It is preferred if the substructure has at least three vertical supports which are connected by at least one common panel. The points of connection of the at least one panel are preferably designed such that the spacings between two respectively adjacent supports connected thereto are equal. A correspondingly configured apparatus has proven to be particularly rigid and usable on a variable basis.

Aspects of the present disclosure also relate to an aircraft structure in which an apparatus according to the present disclosure is arranged, or installed. For explanation of an aircraft structure according to the present disclosure, and of a number of advantageous developments thereof, reference is made to what has been said above.

An apparatus according to the present disclosure is suitable in particular for use in the passenger cabin of a passenger aircraft which is to be repurposed for example into a VIP or hospital plane. The substructure created by the apparatus allows the necessary cabin components to be fastened on the aircraft structure in a more flexible manner than if use had to be made solely of the points of attachment of the aircraft structure itself.

FIG. 1 illustrates, schematically, part of the aircraft structure 1, which forms the aircraft cabin 2 and on which an apparatus 10 according to an aspect of the present disclosure is fastened.

In the excerpt illustrated, the aircraft structure 1 comprises an essentially tube-shaped, pressure-tight outer shell 3, which is supported by frame members 4, and also a cabin floor 5, which is fixed to the outer shell 3 and/or the frame members 4, the outer shell confining the aircraft cabin 2—for the purposes of the explanations given here—to a passenger cabin. In the present context, the cabin floor 5 is regarded as being horizontal, whereby the outer shell 3, in the region of the aircraft cabin 2, forms inter alia the vertically extending side walls 6.

Seat rails 7, as are known for fastening passenger seats in passenger aircraft, are arranged on the cabin floor 5, only the seat rail 7 which is closest to the side wall 6 illustrated being shown here. Arranged individually on the frame members 4 of the outer shell 3 are points of attachment in order for cabin components to be fastened thereon, for example points of attachment 8 for fastening the lower brackets for overhead stowage bins, as are known from passenger aircraft, but also points of attachment for wall paneling (not illustrated), etc.

An apparatus 10 according to the present disclosure is arranged in that region of the aircraft structure 1 which is illustrated. The apparatus 10 is a substructure 11, which is fastened on the aircraft structure 1 and comprises supports 20, which run vertically in relation to the cabin floor 5, and a panel 30, which connects the supports 20.

The supports 20—which, for the sake of clarity, are illustrated only in a simplified state in FIG. 1—are profiles with a C-shaped cross section which are adapted to the shaping of the side wall 6 (or in particular of the frame members 4) of the aircraft structure 1, as is illustrated in FIG. 2. The C-shaped profile here is oriented such that a frame member 4 of the aircraft structure 1 can be at least partially accommodated in the profile of the support 20, so that the support 20 adds as little bulk as possible to the frame member 4.

Figure 2A:
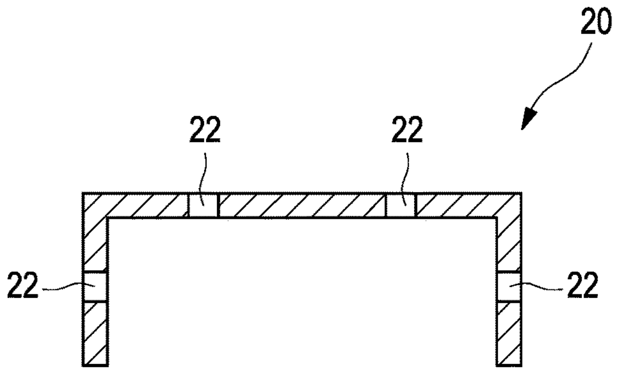
FIG. 2*a* shows a schematic cross section through a support according to FIG. 1.
Figure 2B:
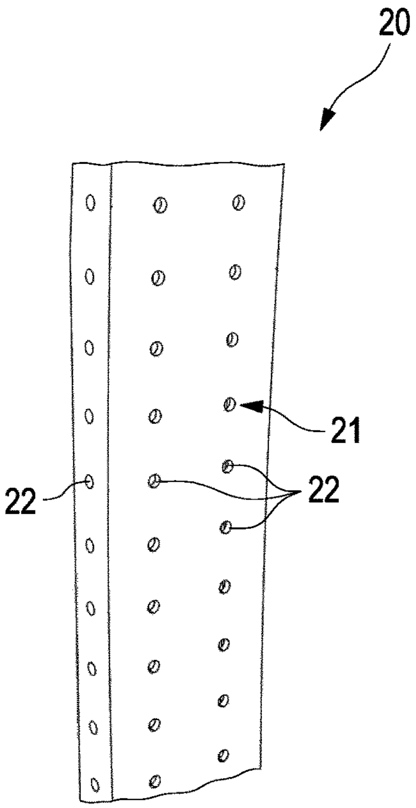
FIG. 2*b* shows a schematic illustration of the pattern of holes in a support according to FIG. 1.

It can also be seen from FIG. 2*a* that the supports 20 are provided with through-bores 22 both on the flange and on the webs. These through-bores 22, which—as can be seen from the schematic illustration of a portion of the support 21 according to FIG. 2*b*—are part of a pattern of holes 21 corresponding to a rectangular grid, allow cabin components, for example wall paneling or furniture, to be fastened thereon. Of course, the through-bores 22 can also be used for connecting to fastening elements (fasteners) 25, 28 and the panel 30, as described at a later stage in the text.

Figure 2C:
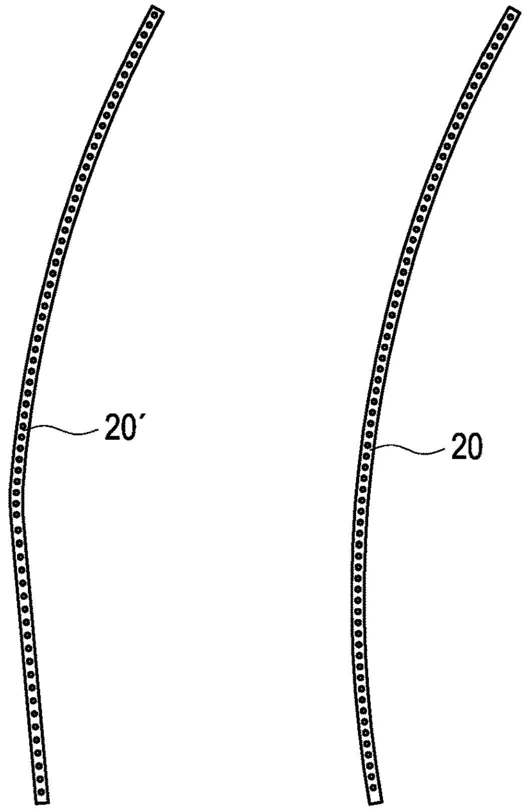
FIG. 2*c* shows a schematic illustration of variants of a support according to FIG. 1.

FIG. 2*c* illustrates two variants of a support 20, wherein the right-hand illustration corresponds to a support 20 from FIG. 1. As can be gathered in particular from the likewise illustrated alternative configuration of a support 20', a support can nevertheless be configured in adaptation to the respective shape of the aircraft structure 1 for which the apparatus 10 according to the present disclosure is intended.

Figure 3A:
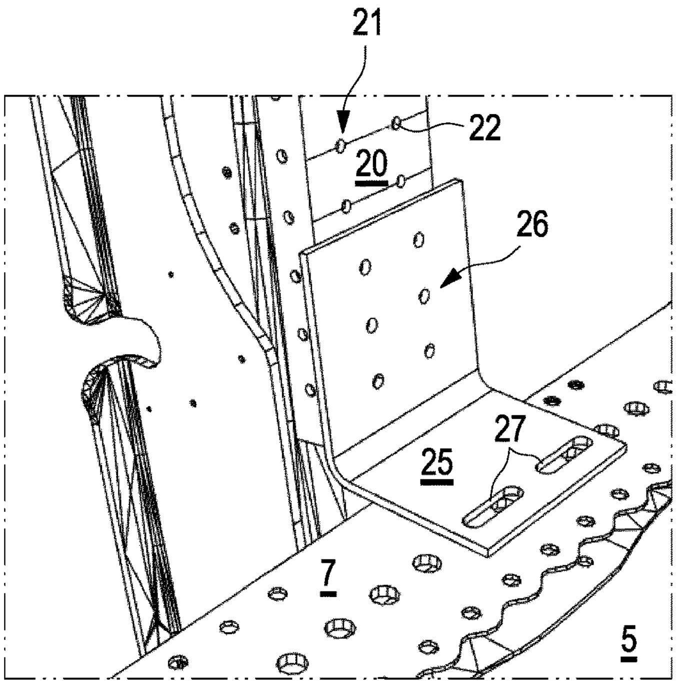
FIG. 3*a* shows a schematic illustration of a fastening element for fastening a support on a seat rail, which runs on the cabin floor.

Coming back to FIG. 1, the supports 20 are each connected at their lower ends, in the vicinity of the cabin floor 5, to the seat rail 7 arranged there, connection being achieved by way of a fastening element 25 configured for this purpose. A specific exemplary embodiment of the fastening element 25 is illustrated schematically in FIG. 3*a*. In this example, the fastening element 25 is L-shaped, wherein the one limb has a rectangular pattern of holes 26 for screw-connection to the corresponding pattern of holes 21 in the support 20, while the other limb has slots 27 for connection to the seat rail 7.

Figure 3B:
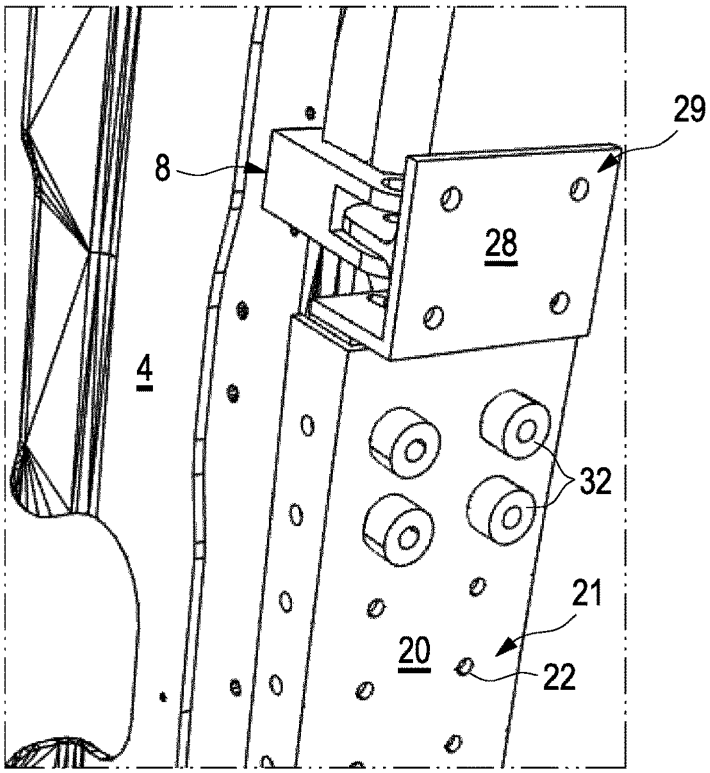
FIG. 3*b* shows a schematic illustration of a fastening element for fastening at a point of attachment for the lower bracket for overhead stowage bins.

Also by way of example, FIG. 3*b* illustrates grommets 32, by means of which the panel 30 can be fastened, by way of its points of connection 31, on the support 20. The grommets 32 are elastically deformable components which can reduce the transmission of vibrations in particular from the aircraft structure 1 to the panel 30.

At that end of the supports 20 which is remote from the cabin floor 5, the supports are fastened on the aircraft structure 1 with the aid of fastening elements 28 for fastening at a respective point of attachment 8 for the lower bracket for overhead stowage bins. A possible configuration of corresponding fastening elements 28 is illustrated schematically in FIG. 3*b*. The fastening element 28 shown in FIG. 3*b* has a pattern of holes 29, at which overhead stowage bins can basically then be fastened. For the main part, however, the fastening element 28 has an extension which can be enclosed by the C profile of the support 20 and on which the support 20 can be fastened by screw-connection within the pattern of holes 21 in the support 20.

Coming back again to FIG. 1, the—in the example illustrated—three supports 20 of the apparatus 10 are connected to one another in a region remote from the cabin floor 5 by a horizontally oriented panel 30. The panel 30 is connected to each of the supports 20 at in each case two vertically spaced-apart points of connection 31. The panel 30 is configured in the form of a sandwich panel and—if required—can have a pattern of holes comparable with the pattern of holes in the supports 20. However, this is not absolutely necessary.

Both the supports 20 and the panel 30 of the apparatus 10 according to the present disclosure are suitable in order for cabin components to be fastened thereon without account having to be taken of the position of points of attachment 8 or the like. Rather, cabin components can be fastened in more or less any desired position on the supports 20 and/or panel 30.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. An apparatus for fastening cabin components in a region of side walls, which belong to an aircraft structure and extend in a vertical direction in relation to a horizontal cabin floor, the apparatus comprising a substructure comprising:

at least two supports, which are vertically arrangeable on a side wall, of the sidewalls of the aircraft structure, are spaced apart in a horizontal direction, are designed in each case for fastening at at least two vertically spaced-apart defined points of attachment of the aircraft structure in the region of the side wall, wherein the at least two vertically spaced-apart defined points of attachment are located on a same support of the at least two supports, and at least one panel, which connects the supports in the horizontal direction and is designed for connecting to the supports, each connected by the panel, at two vertically spaced-apart points of connection, wherein both the at least two supports and the at least one panel are designed in order for cabin components to be fastened thereon, and wherein each of the supports is provided with a pattern of holes for receiving a fastening, wherein the pattern of holes corresponds to a rectangular grid.

2. The apparatus as claimed in claim 1, wherein in a state of being fastened on the aircraft structure, the supports are designed for connecting to the panel in a region remote from the cabin floor.

3. The apparatus as claimed in claim 1, wherein each of the supports has a fastener configured for fastening on a seat rail, which runs on the cabin floor, and/or a fastener configured for fastening at a point of attachment for the lower bracket for overhead stowage bins.

4. The apparatus as claimed in claim 1, wherein each of the supports has a shape adapted to the shaping of the side wall of the aircraft structure.

5. The apparatus as claimed in claim 1, wherein each of the supports has a C-shaped cross section which is open in the direction of the side wall.

6. The apparatus as claimed in claim 1, wherein the pattern of holes are for cabin components and/or the at least one panel to be fastened thereon.

7. The apparatus as claimed in claim 1, wherein the at least one panel is designed in the form of a sandwich panel.

8. The apparatus as claimed in claim 1, wherein the supports comprise at least three vertical supports, wherein the points of connection of the at least one panel are designed such that spacings between two respectively adjacent supports connected thereto are equal.

9. The apparatus as claimed in claim 1, further comprising the aircraft structure comprising the horizontal cabin floor and the side walls which extend in the vertical direction in relation thereto, wherein the points of attachment are provided in the region of the side wall, and wherein the substructure is attached at the aircraft points of attachment.

10. The apparatus as claimed in claim 9, wherein at least some of the points of attachment are formed by a seat rail, which runs on the cabin floor, and/or points of attachment for the lower bracket for overhead stowage bins.

11. The apparatus as claimed in claim 9, wherein the aircraft structure is an aircraft structure of a passenger aircraft and the apparatus is arranged in a passenger cabin.

12. The apparatus as claimed in claim 4, wherein each of the supports has a curvature adapted to the side wall.

13. The apparatus as claimed in claim 5, wherein, for each of the supports, the C-shaped cross section which is open in the direction of the side wall is designed for partially accommodating frame members which run on the side wall.

14. The apparatus as claimed in claim 6, wherein, for each of the supports, the pattern of holes extends over all the flanges or webs of the profile of the support.

15. The apparatus as claimed in claim 1, wherein each of the at least two vertically spaced-apart defined points of attachment of the aircraft structure are vertically spaced apart from the two vertically spaced-apart points of connection.

16. The apparatus as claimed in claim 1, wherein the pattern of holes is configured to provide more holes than all fastening points for cabin components and/or panels of the aircraft structure.

17. The apparatus as claimed in claim 5, wherein each of the supports comprises a first side opposite a second side and a third side between the first side and the second side, and wherein the first side comprises a plurality of holes.

* * * * *